United States Patent
Wilcock

(10) Patent No.: US 10,705,764 B2
(45) Date of Patent: Jul. 7, 2020

(54) PERFORMING NEARLINE STORAGE OF A FILE

(71) Applicant: International Business Machines Corporation, Armonk, NY (US)

(72) Inventor: Glenn R. Wilcock, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 801 days.

(21) Appl. No.: 15/018,666

(22) Filed: Feb. 8, 2016

(65) Prior Publication Data
US 2017/0228370 A1    Aug. 10, 2017

(51) Int. Cl.
G06F 7/00      (2006.01)
G06F 16/00     (2019.01)
G06F 3/06      (2006.01)
G06F 16/11     (2019.01)

(52) U.S. Cl.
CPC ............ *G06F 3/067* (2013.01); *G06F 3/0605* (2013.01); *G06F 3/0608* (2013.01); *G06F 3/0643* (2013.01); *G06F 3/0649* (2013.01); *G06F 16/113* (2019.01)

(58) Field of Classification Search
None
See application file for complete search history.

(56) References Cited

U.S. PATENT DOCUMENTS

| | | | |
|---|---|---|---|
| 6,591,272 B1 | 7/2003 | Williams | |
| 8,352,432 B2 | 1/2013 | Prahlad et al. | |
| 8,683,130 B2 | 3/2014 | Benhase et al. | |
| 8,756,249 B1 | 6/2014 | Wallace et al. | |
| 10,229,067 B2 | 3/2019 | Wilcock | |
| 2007/0233992 A1* | 10/2007 | Sato | G06F 3/0608 711/170 |
| 2009/0240737 A1 | 9/2009 | Hardisty et al. | |
| 2010/0332401 A1* | 12/2010 | Prahlad | G06F 17/30082 705/80 |
| 2010/0332561 A1* | 12/2010 | Prahlad | G06F 11/1458 707/812 |
| 2012/0005165 A1* | 1/2012 | Tsai | G06F 11/1456 707/652 |
| 2012/0078931 A1* | 3/2012 | Jaquette | H04N 21/2181 707/758 |
| 2012/0260040 A1* | 10/2012 | Mallge | G06F 16/278 711/117 |
| 2012/0323821 A1* | 12/2012 | Crk | G06Q 10/08345 705/400 |

(Continued)

OTHER PUBLICATIONS

Wilcock, G., U.S. Appl. No. 15/018,700, filed Feb. 8, 2016.

(Continued)

*Primary Examiner* — Tuan A Pham
(74) *Attorney, Agent, or Firm* — Zilka-Kotab, P.C.

(57) ABSTRACT

In one general embodiment, a computer-implemented method includes identifying a file to be archived, where such file is stored within a first storage area of a system, archiving the file by maintaining a first portion of the file within the first storage area of the system, and transferring a second portion of the file from the first storage area of the system to a second storage area of the system, and performing an action associated with the file, utilizing one or more of the first portion of the file and the second portion of the file.

14 Claims, 8 Drawing Sheets

(56) References Cited

U.S. PATENT DOCUMENTS

| | | | |
|---|---|---|---|
| 2013/0046950 A1 | 2/2013 | Coronado et al. | |
| 2013/0124780 A1* | 5/2013 | Baderdinni | G06F 3/061 |
| | | | 711/103 |
| 2013/0290598 A1* | 10/2013 | Fiske | G06F 3/0625 |
| | | | 711/103 |
| 2014/0040211 A1 | 2/2014 | Avery et al. | |
| 2014/0075455 A1* | 3/2014 | Annapragada | G06F 9/542 |
| | | | 719/318 |
| 2015/0095282 A1* | 4/2015 | Jones | H04L 67/1008 |
| | | | 707/624 |
| 2017/0228325 A1 | 8/2017 | Wilcock | |

OTHER PUBLICATIONS

List of IBM Patents or Patent Applications Treated as Related.
Alatorre et al. "Intelligent Information Lifecycle Management in Virtualized Storage Environments," IEEE, Global Conference (SRII), 2014 Annual SRII, Apr. 23-25, 2014, pp. 9-18.
Kern, R.F., "IBM System z & DS8000 Technology Synergy," IBM ATS Americas Disk Storage, Jul. 21, 2009, pp. 1-25.
Mattman et al., "Experiments with Storage and Preservation of NASA's Planetary Data via the Cloud," IT Pro, IEEE Computer Society, Sep./Oct. 2010, pp. 28-35.
Nguyen et al., "Content Server System Architecture for Providing Differentiated Levels of Service in a Digital Preservation Cloud," 2011 IEEE 4th International Conference on Cloud Computing, Jul. 4-9, 2011, pp. 557-564.
Van Horn et al., "Why share data? Lessons learned from the fMRIDC," NeuroImage, vol. 82, Nov. 2013, pp. 677-682.
Anonymous, "Emc Object-Based Storage for Active Archiving and Application Development," Taneja Group, Nov. 2012, pp. 1-12.
Anonymous, "Quantum Lattus: Next-Generation Object Storage for Big Data Archives," Quantum, Sep. 2013, pp. 1-10.
Non-Final Office Action from U.S. Appl. No. 15/018,700, dated Jun. 1, 2018.
Notice of Allowance from U.S. Appl. No. 15/018,700, dated Oct. 30, 2018.

* cited by examiner

PERFORMING NEARLINE STORAGE OF A FILE

BACKGROUND

The present invention relates to file management, and more specifically, this invention relates to performing nearline storage of one or more files within a file storage system.

Currently, when a file is archived, data and metadata associated with the file are removed from online storage and stored on offline storage in an attempt to reduce file storage total cost of ownership (TCO). When files are archived in offline storage, an inventory is maintained to store the metadata within the offline storage location. However, there are costs associated with this current archiving technique that may cause an overall cost of the archive solution to exceed any cost advantage gained from storing the data offline.

These costs include the host based processing that is required to read the data from online storage and write it to offline storage. These costs also include the host based processing that is required to capture the metadata and store it in an inventory offline. Additionally, these costs include host based management of the offline storage. Further, these costs include maintaining an inventory that is comprised of metadata and the location of the archived file on the offline storage.

There is therefore a need to minimize or eliminate the costs associated with the aforementioned archiving technique.

SUMMARY

A computer-implemented method according to one embodiment includes identifying a file to be archived, where such file is stored within a first storage area of a system, archiving the file by maintaining a first portion of the file within the first storage area of the system, and transferring a second portion of the file from the first storage area of the system to a second storage area of the system, and performing an action associated with the file, utilizing one or more of the first portion of the file and the second portion of the file.

According to another embodiment, a computer program product for performing nearline storage of a file comprises a computer readable storage medium having program instructions embodied therewith, wherein the computer readable storage medium is not a transitory signal per se, and the program instructions are executable by a processor to cause the processor to perform a method. Additionally, the method comprises identifying, by the processor, a file to be archived, where such file is stored within a first storage area of a system archiving the file by the processor by maintaining a first portion of the file within the first storage area of the system, and transferring a second portion of the file from the first storage area of the system to a second storage area of the system, and performing an action associated with the file by the processor, utilizing one or more of the first portion of the file and the second portion of the file.

A system according to another embodiment includes a processor and logic integrated with and/or executable by the processor, where the logic is configured to identify a file to be archived, where such file is stored within a first storage area of a system, archive the file by maintaining a first portion of the file within the first storage area of the system, and transferring a second portion of the file from the first storage area of the system to a second storage area of the system, and perform an action associated with the file, utilizing one or more of the first portion of the file and the second portion of the file.

A computer-implemented method according to another embodiment includes identifying a file as being eligible for a transition from online storage to nearline storage within a system, exclusively serializing the adding an exclusive serialization to a file within the system, keeping all metadata associated with the file intact on the online storage within the system, collecting all physical extents within the system that comprise a data portion of the file, offloading the collected physical extents to an object store, and removing from the system the exclusive serialization of the file.

A computer-implemented method according to another embodiment includes receiving at a system a request to access a file that is stored in nearline storage, exclusively serializing the requested file within the system, processing an online metadata portion of the file to identify all of the physical extents that comprise a data portion of the file, returning the identified physical extents from offline storage to online storage, resetting a nearline file indicator associated with the file, and releasing the serializing of the file within the system.

Other aspects and embodiments of the present invention will become apparent from the following detailed description, which, when taken in conjunction with the drawings, illustrate by way of example the principles of the invention.

DETAILED DESCRIPTION

Figure 1:
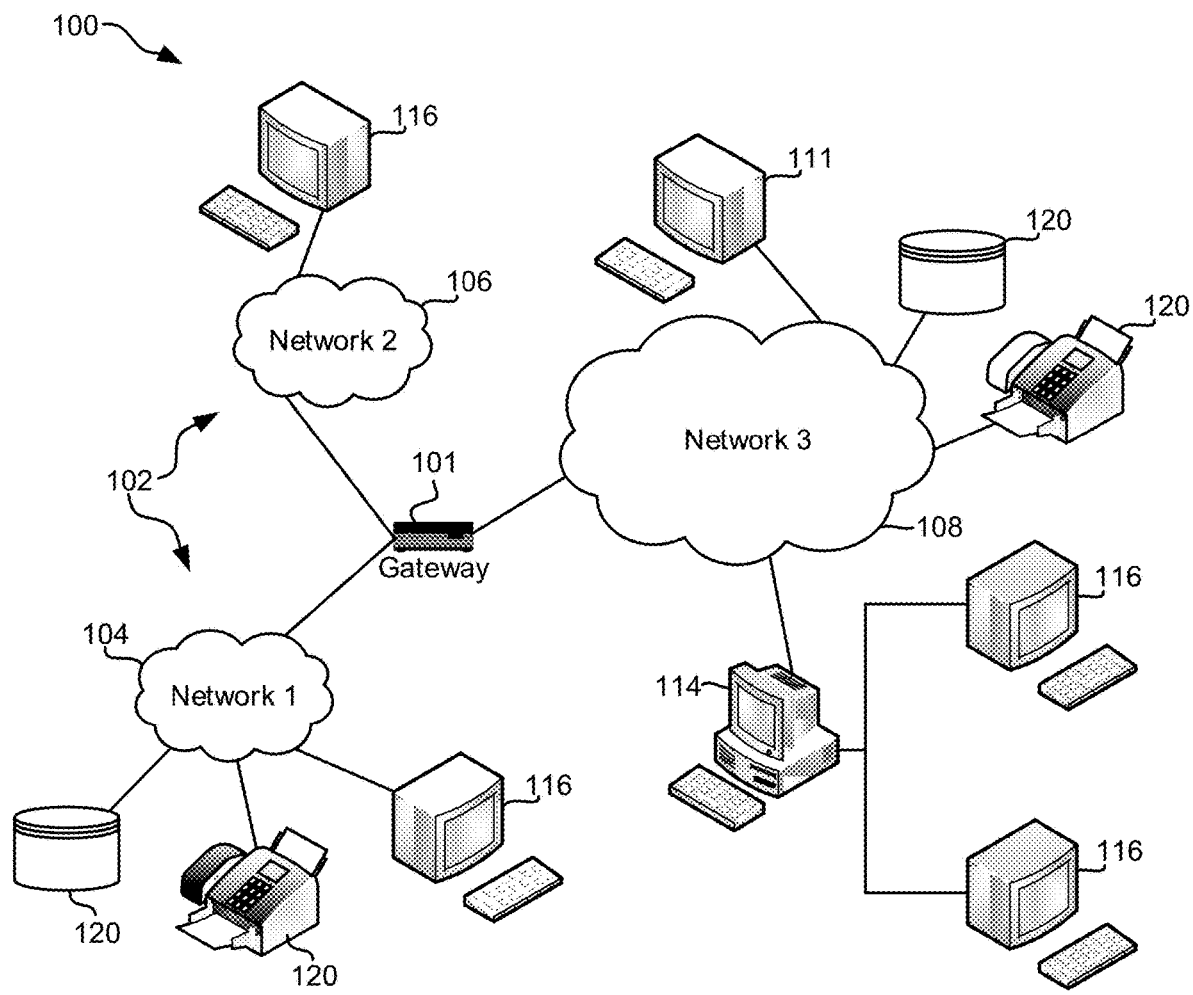
FIG. 1 illustrates a network architecture, in accordance with one embodiment.

The following description discloses several preferred embodiments of systems, methods and computer program products for performing nearline storage of a file. Various embodiments provide a method to store metadata for a file online while storing physical extents of the file in offline storage.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for performing nearline storage of a file.

In one general embodiment, a computer-implemented method includes identifying a file to be archived, where such file is stored within a first storage area of a system, archiving the file by maintaining a first portion of the file within the first storage area of the system, and transferring a second portion of the file from the first storage area of the system to a second storage area of the system, and performing an action associated with the file, utilizing one or more of the first portion of the file and the second portion of the file.

In another general embodiment, a computer program product for performing nearline storage of a file comprises a computer readable storage medium having program instructions embodied therewith, wherein the computer readable storage medium is not a transitory signal per se, and the program instructions are executable by a processor to cause the processor to perform a method. Additionally, the method comprises identifying, by the processor, a file to be archived, where such file is stored within a first storage area of a system archiving the file by the processor by maintaining a first portion of the file within the first storage area of the system, and transferring a second portion of the file from the first storage area of the system to a second storage area of the system, and performing an action associated with the file by the processor, utilizing one or more of the first portion of the file and the second portion of the file.

In another general embodiment, a system includes a processor and logic integrated with and/or executable by the processor, where the logic is configured to identify a file to be archived, where such file is stored within a first storage area of a system, archive the file by maintaining a first portion of the file within the first storage area of the system, and transferring a second portion of the file from the first storage area of the system to a second storage area of the system, and perform an action associated with the file, utilizing one or more of the first portion of the file and the second portion of the file.

In another general embodiment, a computer-implemented method includes identifying a file as being eligible for a transition from online storage to nearline storage within a system, exclusively serializing the adding an exclusive serialization to a file within the system, keeping all metadata associated with the file intact on the online storage within the system, collecting all physical extents within the system that comprise a data portion of the file, offloading the collected physical extents to an object store, and removing from the system the exclusive serialization of the file.

In another general embodiment, a computer-implemented method includes receiving at a system a request to access a file that is stored in nearline storage, exclusively serializing the requested file within the system, processing an online metadata portion of the file to identify all of the physical extents that comprise a data portion of the file, returning the identified physical extents from offline storage to online storage, resetting a nearline file indicator associated with the file, and releasing the serializing of the file within the system.

In another general embodiment, a computer-implemented method includes determining that a file is to be archived within a system, removing physical extents for the file from an online storage of the system and placing the physical extents in an offline storage of the system, maintaining file metadata within the online storage of the system, retrieving the physical extents for the file from the offline storage and moving the physical extents to online storage in response to a request for the file, determining that the file is to be archived again within the system, determining that the physical extents for the file placed in the offline storage of the system have not changed since the physical extents for the file were retrieved from the offline storage and moved to the online storage, and removing the physical extents for the file from the online storage, and utilizing the physical extents for the file placed in the offline storage of the system, in response to determining that the offline storage of the physical extents for the file has not changed.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
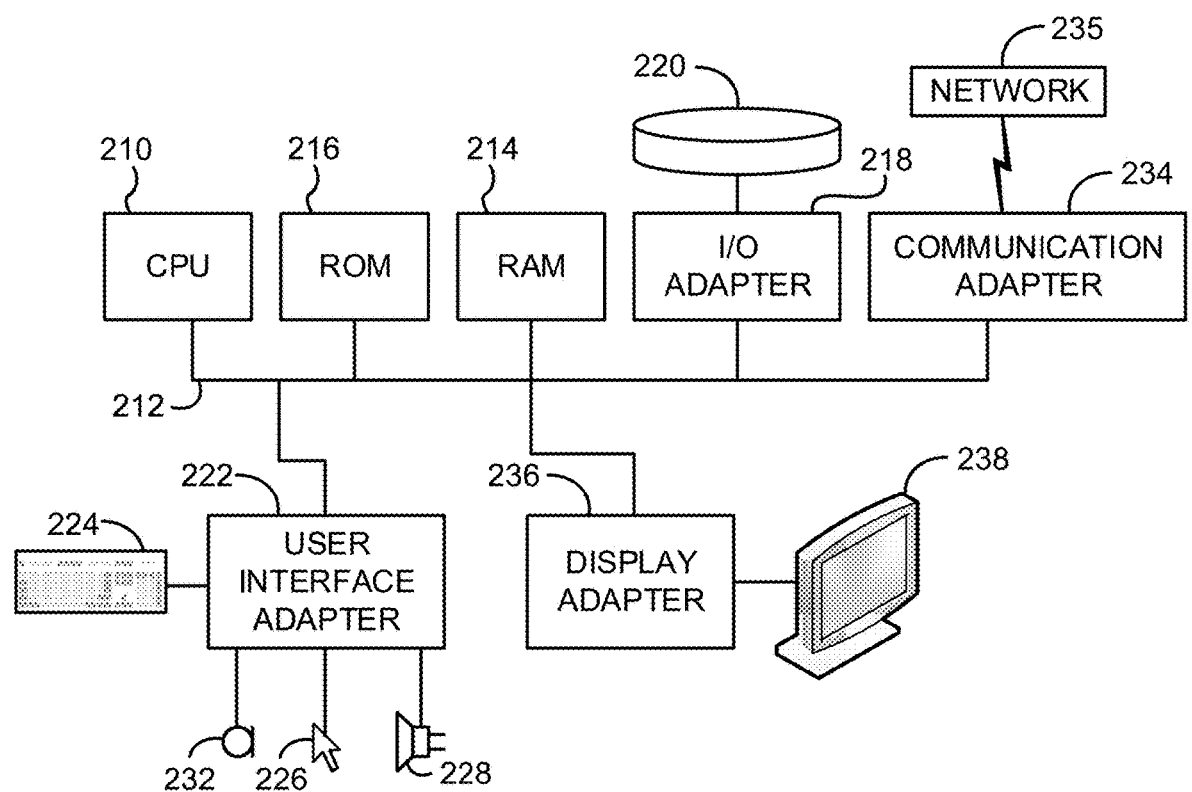
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
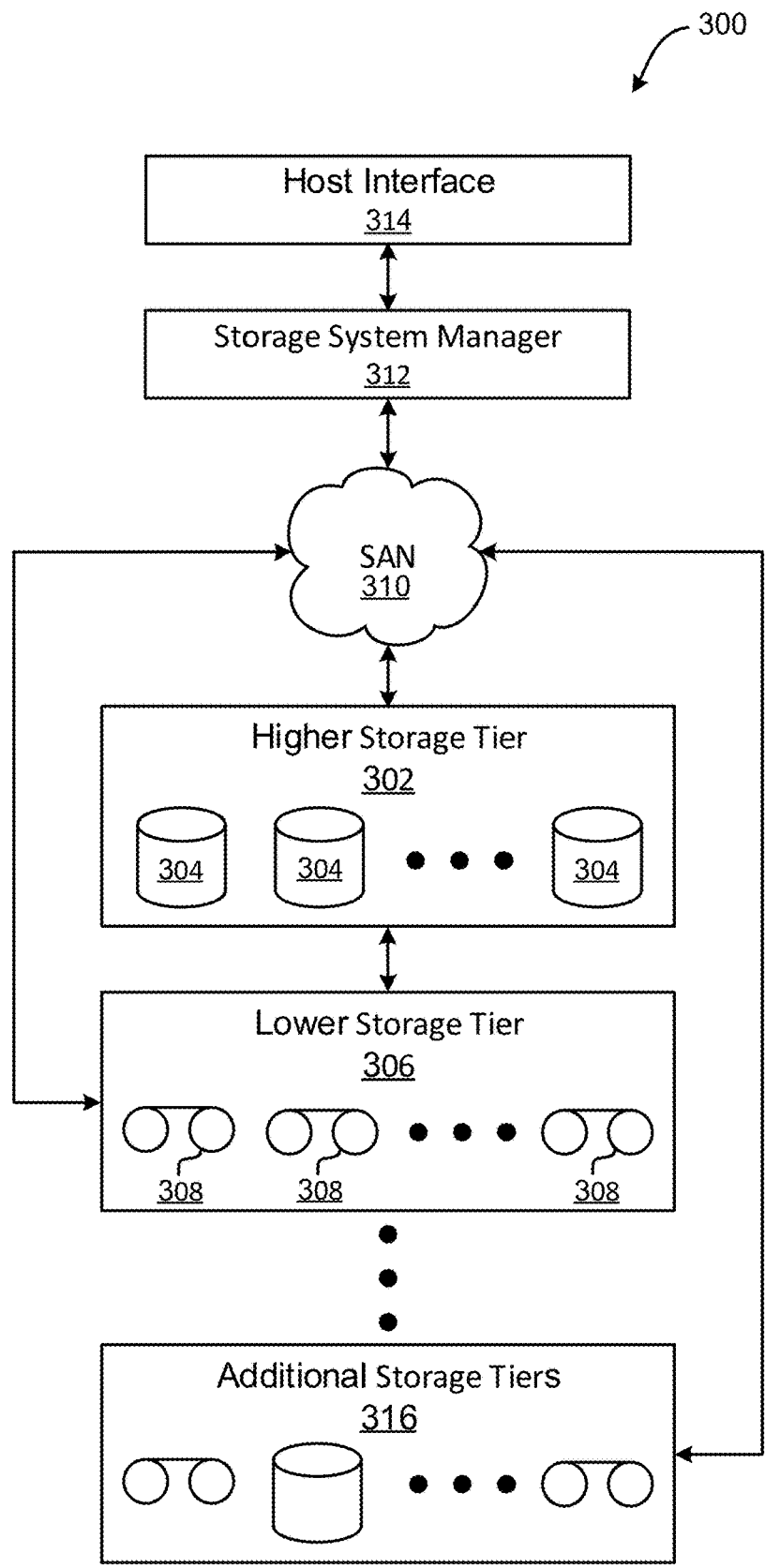
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
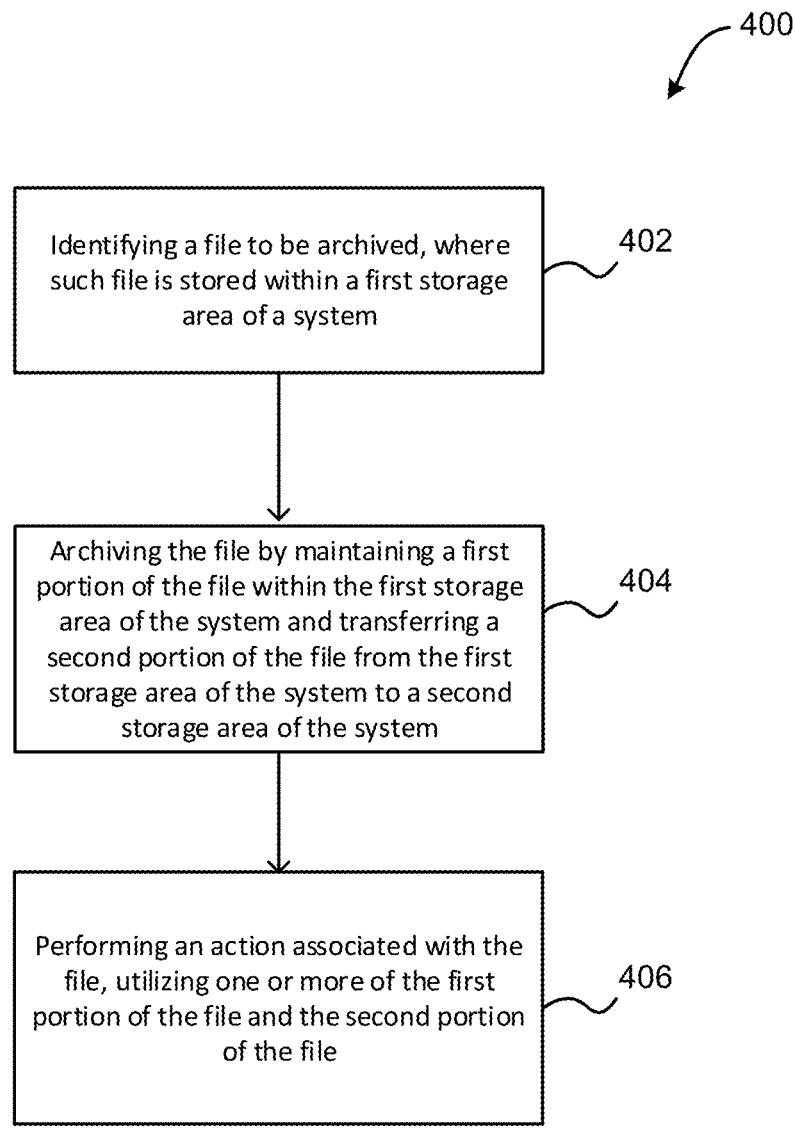
FIG. 4 illustrates a method for performing nearline storage of a file, in accordance with one embodiment.

Now referring to FIG. 4, a flowchart of a method 400 is shown according to one embodiment. The method 400 may be performed in accordance with the present invention in any of the environments depicted in FIGS. 1-3 and 5-8, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a file to be archived is identified, such file being stored within a first storage area of a system. In one embodiment, the file may include any data capable of being stored within the system. In another embodiment, the system may include one or more computing devices (e.g., one or more servers, personal computers, mobile computing devices, etc.). In yet another embodiment, the system may be included within a cluster additional systems (e.g., a sysplex, etc.).

Additionally, in one embodiment, the file may be physically stored within the first storage area of a system, where the first storage area of a system may include online storage. For example, the file may be physically stored in a repository space of the system (e.g., a physical hard disk drive of the system, a physical memory of the system, etc.), and the file may be physically located within the repository space of the system. In another example, the file may include one or more physical extents (e.g., one or more contiguous areas of storage reserved for the file in a file system) and file metadata both located within the first storage area of the system. In another embodiment, the first storage area of the system may be purchased from a repository space provider (e.g., a service provider, etc.).

Further, in one embodiment, the file may be selected to be archived by the system according to one or more predetermined policies. For example, the file may be selected to be archived when it is determined by the system that the file is not going to be referenced for a predetermined period of time. In another example, the file may be selected to be archived when it is determined that the file has not been referenced for a predetermined period of time. In another embodiment, the file may be manually selected to be archived by one or more users of the system. Of course, however, the file may be selected to be archived in any manner.

Further still, as shown in FIG. 4, method 400 may proceed with operation 404, where the file is archived by maintaining a first portion of the file within the first storage area of the system, and transferring a second portion of the file from the first storage area of the system to a second storage area of the system. In one embodiment, the first portion of the file may include metadata. For example, the first portion of the file may include an identifier of the file, an identifier of one or more users associated with the file, a description of a data portion of the file, etc.

Also, in one embodiment, the second portion of the file may include one or more physical extents. For example, one or more physical extents of the file that comprise the data portion of the file and that are located within the first storage area of the system may be moved to the second storage area of the system. In another embodiment, the second storage area of the system may include a storage area separate from the first storage area of the system. For example, the second storage area of the system may include offline storage. In another example, the second storage area of the system may include cloud storage (e.g., one or more servers implementing a cloud data storage model, etc.).

In another embodiment, the first portion of the file maintained within the first storage area of the system may include one or more logical pointers to an original location of the one or more physical extents within the first storage area of the system. In another embodiment, these one or more logical pointers may be used for a return of the one or more physical extents from the second storage area to the first storage area. For example, if the one or more physical extents are retrieved from the second storage area in response to a request for the file, the one or more physical extents may be moved to the original location within the first storage area of the system indicated by the one or more logical pointers.

In addition, in one embodiment, transferring the second portion of the file from the first storage area of the system to the second storage area of the system may include creating one or more objects within the cloud storage that correspond to the second portion of the file. For example, one or more physical extents of the file that are located within the first storage area of the system may be stored within one or more objects within the cloud storage. In another embodiment, one or more logical extents may be stored within the first storage area of the system, where the one or more logical extents refer to one or more physical extents stored in the second storage area of the system.

Furthermore, in one embodiment, archiving the file may be performed utilizing one or more procedures (e.g., applications, processes, etc.) within the system. In another embodiment, archiving the file may include serializing the file within the first storage area of the system. For example, exclusive access to the file within the first storage area of the system may be granted to the one or more procedures such that no other procedures may access the file during the archiving.

Further still, in one embodiment, archiving the file may include setting an indicator in association with the file. For example, a flag may be added to the metadata of the file. In another embodiment, the flag may indicate that the file is now a nearline file (e.g., a file stored utilizing both online and offline storage techniques simultaneously, etc.). For example, the file may be identified as being stored utilizing an intermediate type of data storage that represents a compromise between online storage (which may support frequent, very rapid access to data) and offline storage/archiving (which may be used for backups or long-term storage, with infrequent access to data). In another example, the file include a file whose metadata portion resides on online storage (supporting frequent, very rapid access to the metadata portion) and whose data portion resides on offline storage (long-term storage with infrequent access).

In another embodiment, archiving the file may include collecting the one or more physical extents of the file within the first storage area of the system and transferring the one or more physical extents of the file to the second storage area of the system. In yet another embodiment, archiving the file may include removing the one or more physical extents of the file from the first storage area of the system after they have been transferred to the second storage area of the system.

Also, in one embodiment, the first portion of the file may include an indication of a location of the second portion of the file. For example, the metadata may include an indication of one or more storage locations associated with the file. In another embodiment, the first portion of the file may include a location of the second portion of the file within the second storage area of the system. For example, the metadata may include one or more logical extents indicating one or more locations where the second portion of the file is stored within the second storage area of the system (e.g., one or more object names within the second storage area, etc.).

Further, in one embodiment, the second portion of the file may be stored within an object of the second storage area of the system. In another embodiment, the object of the second storage area of the system may be named according to one or more criteria. For example, the object of the second storage area of the system may have a name that includes a name of the file to be archived and a physical location of the second portion of the file within the second storage area of the system. In this way, the second portion of the file may be identified in the second storage area of the system without maintaining an inventory of its location.

Also, in one embodiment, archiving the file may include releasing serialization of the file within the first storage area of the system. For example, exclusive access to the file within the first storage area of the system may be removed, such that procedures other than the procedure performing the archiving may access the file.

Additionally, as shown in FIG. 4, method 400 may proceed with operation 406, where an action associated with the file is performed, utilizing one or more of the first portion of the file and the second portion of the file. In one embodiment, the action may include accessing the second portion of the file (e.g., in response to a request for the file, etc.). For example, a request for access to the file may be intercepted within the system, and in response to the interception of the request, the physical extents may be retrieved from the second storage area of the system and moved to the first storage area of the system.

Further, in one embodiment, the action may include accessing the first portion of the file. For example, a request to run an analysis utilizing file metadata may be intercepted within the system, and in response to the interception of the request, the metadata of the file may be retrieved from the first storage area of the system without accessing the second storage area of the system.

In this way, the archived file may be stored as a nearline file, with the first portion of the file stored online and the second portion of the file stored offline. This may eliminate the processing and storage of metadata offline during the archiving process. Additionally, the concept of nearline files may be applied to files to be archived within a system, where such nearline files may have a metadata portion residing on online storage (that may support frequent, very rapid access to the metadata portion) and may have a data portion residing on offline storage (that may support long-term storage with infrequent access).

Maintaining file metadata online may eliminate both a need to process the metadata as part of an archive and a need to store any portion of the metadata on an offline inventory. The need to maintain an offline inventory may also be further eliminated by creating a unique scheme of cloud container and object names within the offline storage area that directly correlate to a location of physical extents of the file as they reside on online storage at the time that the data is moved offline.

While the online metadata may preserve the logical extents for the file on the first storage area of the system (e.g., by reserving such extents, etc.), the physical extent space may be reclaimed (e.g., using thin provisioning, etc.) such that the provisioned space for the moved file may be reclaimed immediately after the physical extents for that file have been physically moved offline. In this way, the physical extents may be reclaimed while the logical extents may be reserved, such that when the second portion of the file is retrieved from the second storage area of the system, the second portion of the file may be returned to the same logical extents reserved within the first storage area of the system.

In one embodiment, when ample repository storage is determined to be available, the offloading of the archived data to the object store may be delayed such that when a nearline file is accessed, the requested data may still be physically online and all that is required for immediate online access may be for a software layer of the system to update the metadata of the file to indicate such, and to communicate to the storage controller of the system that the extents are no longer eligible to be offloaded.

Figure 5:
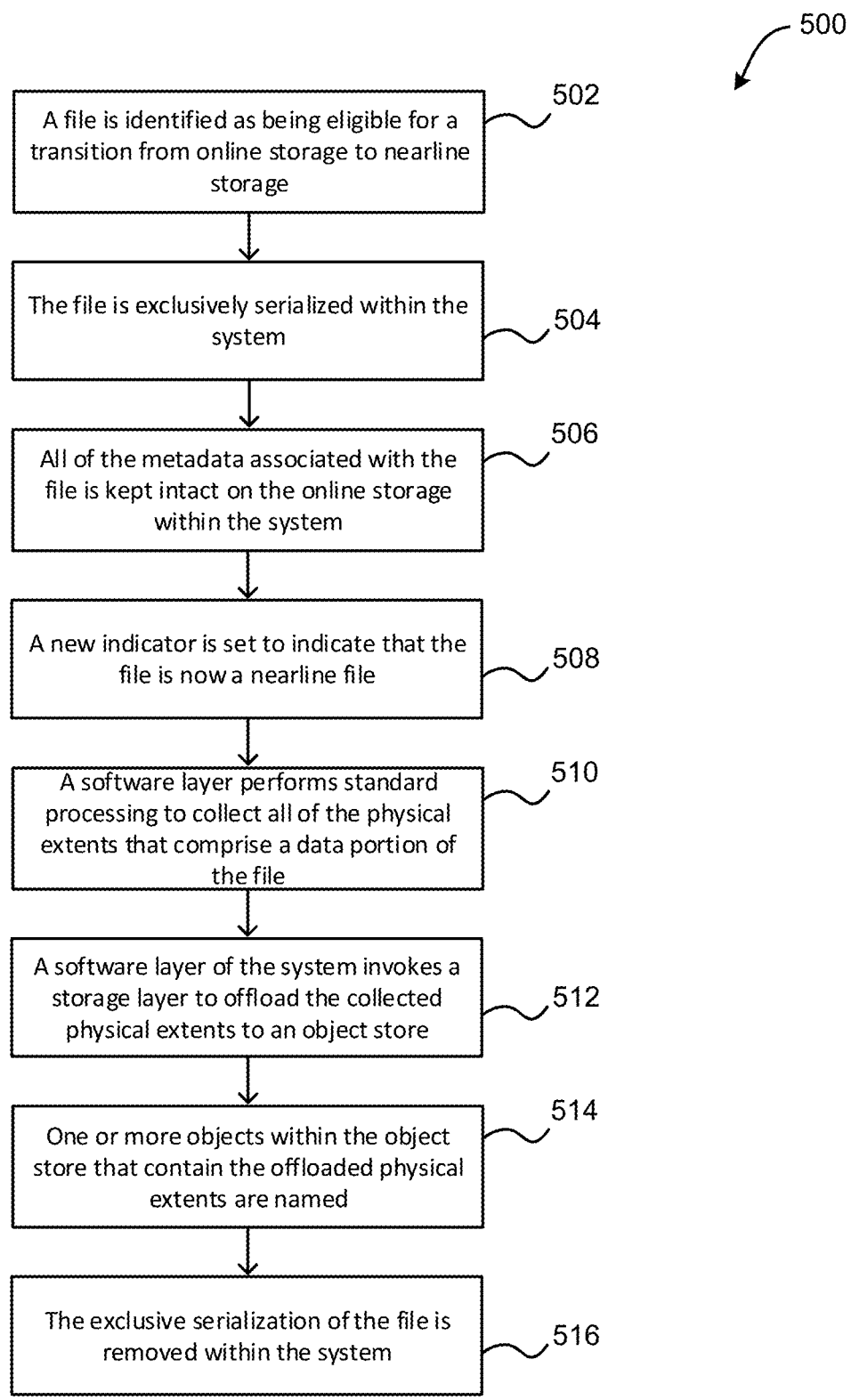
FIG. 5 illustrates a method for transitioning from an online storage of a file to a nearline storage of the file, in accordance with one embodiment.

Now referring to FIG. 5, a flowchart of a method 500 for transitioning from an online storage of a file to a nearline storage of the file is shown according to one embodiment. The method 500 may be performed in accordance with the present invention in any of the environments depicted in FIGS. 1-4 and 6-8, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a file is identified as being eligible for a transition from online storage to nearline storage. In one embodiment, the file may be identified as being eligible to be archived within a system. For example, a status of the file may be compared to one or more predetermined criteria (e.g., one or more policies, etc.), and it may be determined that the file is to be archived based on the comparison. For instance, it may be determined that the file is to be archived in response to a determination that the file has not been accessed within the system for a predetermined period of time, that the file has been explicitly selected by a user of the system for archiving, etc.

Additionally, method 500 may proceed with operation 504, where the file is exclusively serialized within the system. In one embodiment, exclusively serializing the file may ensure that the file remains inactive during the transition from online storage to nearline storage. For example, exclusively serializing the file may include granting exclusive file access to one or more applications performing the transitioning of the file from online storage to nearline storage.

Further, method 500 may proceed with operation 506, where all of the metadata associated with the file is kept intact on the online storage within the system. For example, in z/OS, the metadata that is kept intact may include the BCS (Basic Catalog Structure), VTOC (Volume Table of Contents) and VVDS (VSAM Volume Data Set).

Further still, method 500 may proceed with operation 508, where a new indicator is set to indicate that the file is now a nearline file. In one embodiment, the new indicator may be set within metadata of the file. In another embodiment, the indicator may include a new flag (e.g., a flag in a Catalog structure (BCS/VVDS) in z/OS, etc.).

Also, method 500 may proceed with operation 510, where a software layer performs standard processing to collect all of the physical extents that comprise a data portion of the file. In one embodiment, a software layer of the system may flag each of the physical extents as being offline. In another embodiment, a structure of the file may include a single extent on a single logical volume (e.g., a logically arranged storage space, etc.). In yet another embodiment, a structure of the file may include multiple, differently sized extents that are spread across multiple logical volumes, where such logical volumes are spread across multiple control units. In still another embodiment, the physical extents may indicate online storage locations of the file within the system.

In addition, method 500 may proceed with operation 512, where a software layer of the system invokes a storage layer to offload the collected physical extents to an object store. In one embodiment, the object store may include offline storage of the system (e.g., cloud storage, etc.). In another embodiment, a metadata portion of the file may remain in online storage of the system. In yet another embodiment, unique container and object names (e.g., objects in cloud storage, etc.) may be used to identify the collected physical extents (e.g., so that they may be identified using the online metadata portion of the file, without the need for a separate inventory, etc.). In still another embodiment, all control units may have a connection to the same cloud storage object store for files allocated across multiple control units. In another embodiment, the software layer may directly offload the physical extents to the offline storage as opposed to invoking the storage layer.

Also, in one embodiment, offloading the physical extents may be done asynchronously based on a defined threshold for available repository storage. For example, a timing of an offload may be determined by either the software or storage layer. In another embodiment, the physical extents that need to be offloaded may be queued. For example, a queuing scheme based on factors such as size and age may be used to optimize an order in which extents are offloaded. In yet another embodiment, when a defined high threshold for the repository storage is reached, the offloading from the prioritized queue may begin. In still another embodiment, as extents are offloaded, the corresponding physical space may be released and returned as free space in the repository storage. In another embodiment, the offloading may continue until a low threshold is reached or the queue is empty.

In another embodiment, in a replicated environment, (e.g., an IBM Metro Mirror and/or Global Mirror environment, etc.), the actual offload of the data to the object store may be performed by secondary/tertiary controllers such that a transition from an online file to a nearline file may only consume a minimal amount of processing on both host server and primary storage controllers. This may enable nearline file processing to occur concurrently with production processing, whereas traditional archive processing may be limited to off-peak hours due to an amount of host server and primary storage controller resources that it consumes.

Additionally, in one embodiment, an archiving solution (e.g., a DS8K MCStore solution, etc.) may enable a software layer (e.g., the DFSMS) to direct the DS8K to move physical extents directly to a cloud object store. This function may eliminate additional costs of an archive solution. For example, concerning host based processing required to read the data from online storage and write it to offline storage, with MCStore, the data may be written directly from the DS8K to an object store without any host processor intervention. Additionally, all compression and encryption may be performed within the DS8K. In another example, concerning host based management of the offline storage, the physical storage to which the data is archived may be virtualized by the Cloud layer and the Cloud infrastructure may provide all storage management.

Furthermore, method 500 may proceed with operation 514, where one or more objects within the object store that contain the offloaded physical extents are named. In one embodiment, the name of each logical volume on which a file resides may be contained within a catalog structure. For example, each logical volume may contain a VTOC which may identify the file's logical extents that reside on that volume. In another embodiment, the software layer may create a container for each logical volume using the logical volume name. For example, a unique object name may be created using the name of the file and the physical location of the beginning of the extent.

In another example, if file TEST.DATA resides on VOL001 and has a single extent beginning on extent CCCCcccH 00100000, then the software layer may direct the storage layer to create object TEST.DATA/00100000/000000 in container VOL001. In another embodiment, CCCCcccH may indicate a DFSMS nomenclature for representing the cylinder/head location of an extent. In another embodiment, if a data set is large enough that it exceeds the maximum object size, then the storage layer may create multiple objects, and may increment the suffix '/000000' for each additional object that is required.

In yet another example, if file TEST.DATA2 resides on 2 volumes, VOL001 and VOL002, and has two extents on each volume, with some extents being large, data objects may be created as follows:

Container VOL001, Data objects: TEST.DATA2/00EE0000/000000, TEST.DATA2/00EE0000/000001, TEST.DATA2/01F20000/000000

Container VOL002, Data objects: TEST.DATA2/00001000A/000000, TEST.DATA2/000F0000/000000, TEST.DATA2/000F0000/000001

Further still, method 500 may proceed with operation 516, where the exclusive serialization of the file is removed within the system. For example, removing exclusive serialization of the file may include removing exclusive file access to one or more applications performing the transitioning of the file from online storage to nearline storage. In one embodiment, the offloaded physical extents may be deleted according to one or more criteria. For example, the offloaded physical extents may be deleted after a predetermined time period has elapsed.

In this way, a portion of a file including metadata may be stored online within a system, while another portion of the file including physical extents may be stored offline within the system.

Figure 6:
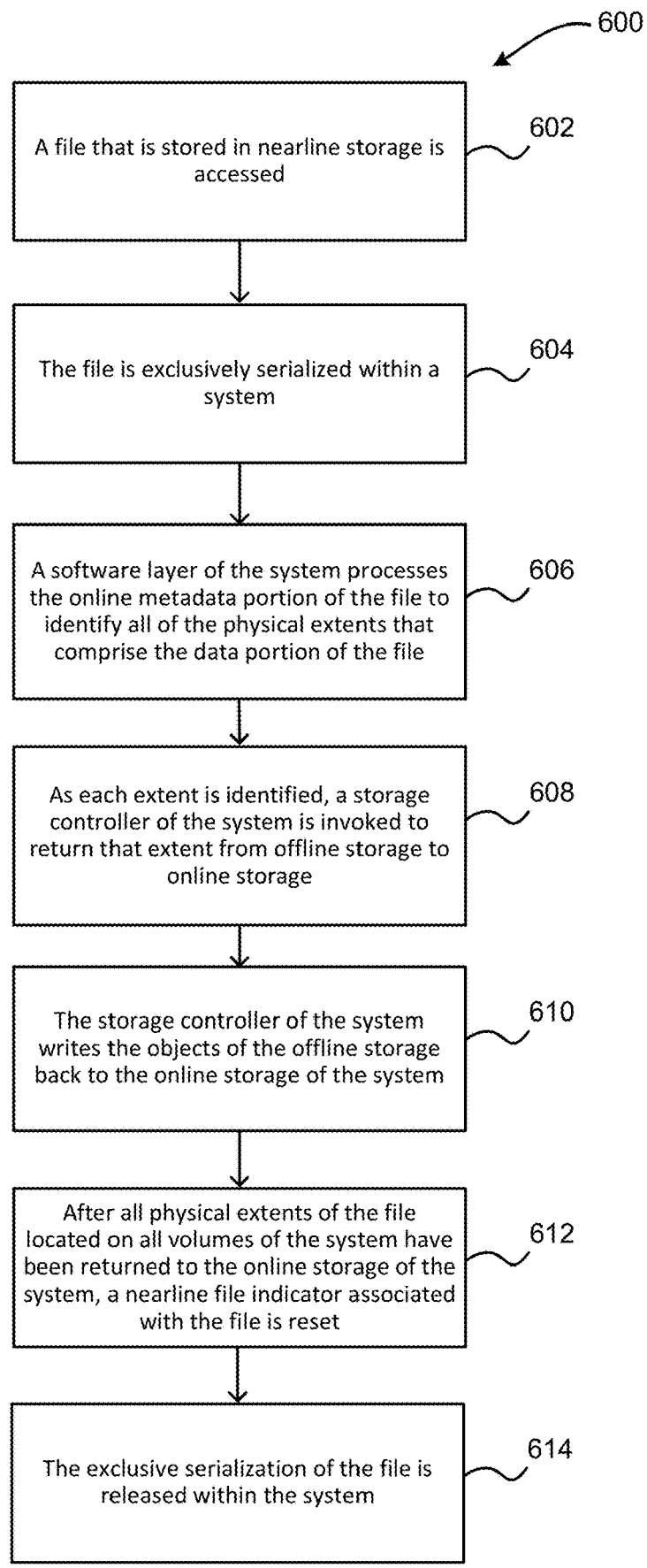
FIG. 6 illustrates a method for transitioning from a nearline storage of a file to an online storage of the file, in accordance with one embodiment.

Now referring to FIG. 6, a flowchart of a method 600 for transitioning from a nearline storage of a file to an online storage of the file is shown according to one embodiment. The method 600 may be performed in accordance with the present invention in any of the environments depicted in FIGS. 1-5, 7, and 8 among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a request to access a file that is stored in nearline storage is received at a system. In one embodiment, the file may be implicitly accessed. For example, the file may be accessed through a file event such as an OPEN request. In another embodiment, the file may be explicitly accessed (e.g., by a command entered by a user or application, etc.).

Additionally, method 600 may proceed with operation 604, where the file is exclusively serialized within the system. In one embodiment, exclusively serializing the file may ensure that the file remains inactive during the transition from nearline storage to online storage. Further, method 600 may proceed with operation 606, where a software layer of the system processes the online metadata portion of the file to identify all of the physical extents that comprise the data portion of the file. In one embodiment, the same algorithm may be used when transitioning a file from online storage to nearline storage.

Further still, method 600 may proceed with operation 608, where as each extent is identified, a storage controller of the system is invoked to return that extent from offline storage to online storage. In one embodiment, one or more containers may be passed from the offline storage by constructing one or more names from a logical volume name, file name and extent location stored within the online metadata portion of the file.

Also, method 600 may proceed with operation 610, where the storage controller of the system writes the objects of the offline storage back to the online storage of the system. In one embodiment, the storage controller of the system writes the objects of the offline storage back to the online storage of the system at the specified extent location indicated within the online metadata portion of the file. In another embodiment, after the writing of the objects is completed, the software layer may reset the offline flag within the online metadata portion of the file to indicate that the extent is now online. For example, the offline flag may be reset either synchronously or asynchronously.

In addition, in one embodiment, if it is determined that the one or more of the physical extents are still queued to be offloaded to the offline storage of the system, the software or storage layer may remove the one or more physical extents from the queue and may return notification that the extent is online. In this way, no actual data movement may occur. In another embodiment, if a file is comprised of n extents, then 0 to n extents will need to be moved from offline storage to online storage.

Furthermore, method 600 may proceed with operation 612, where after all physical extents of the file located on all volumes of the system have been returned to the online storage of the system, a nearline file indicator associated with the file is reset. In one embodiment, the nearline file indicator may be included within the metadata portion of the file. In another embodiment, resetting the nearline file indicator may indicate that the file is now online within the system. Further still, method 600 may proceed with operation 614, where the exclusive serialization of the file is released within the system. In one embodiment, releasing the exclusive serialization of the file may enable additional applications and/or users to access the file within the system.

Figure 7:
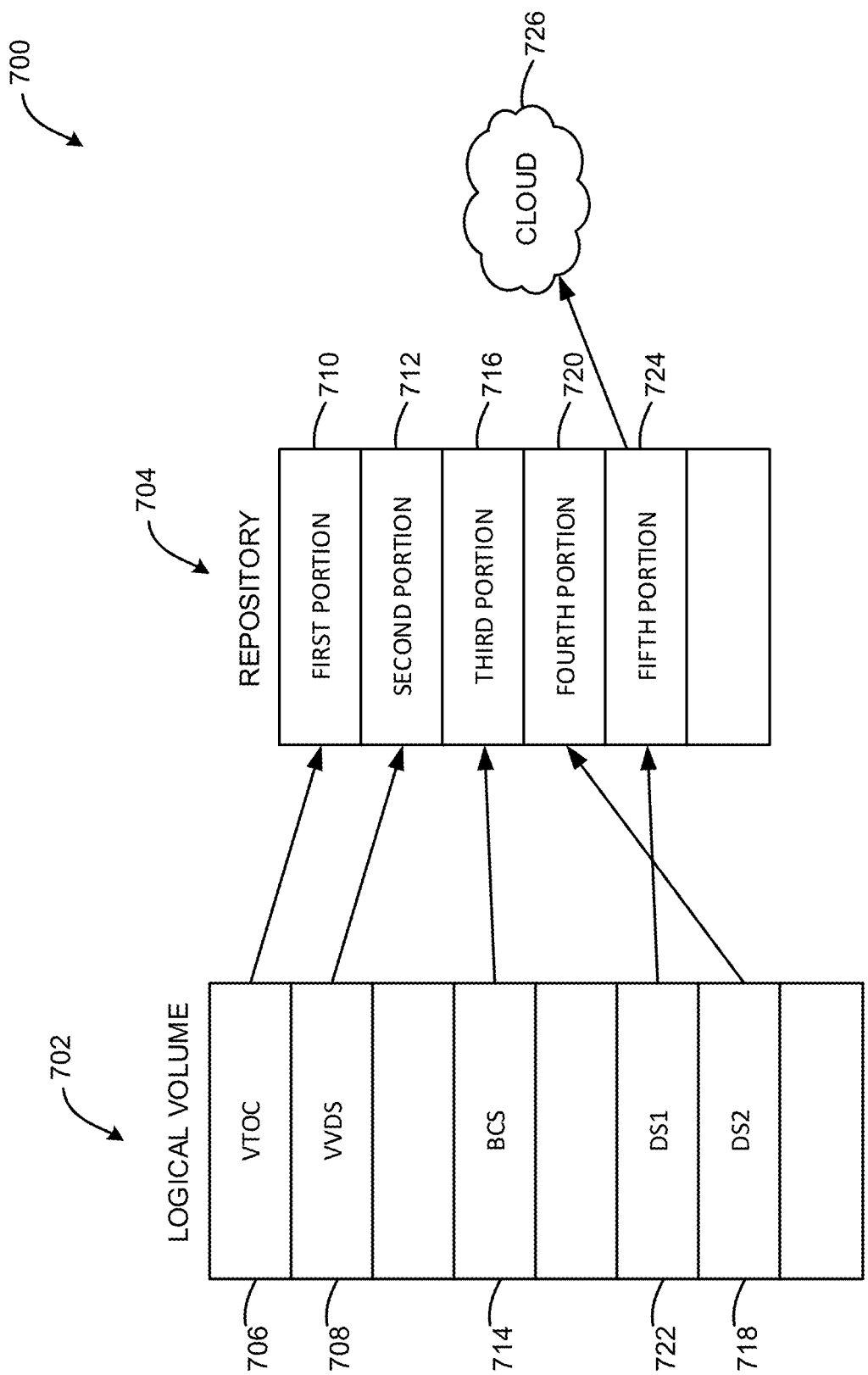
FIG. 7 illustrates an exemplary nearline data set system environment, in accordance with one embodiment.

FIG. 7 illustrates an exemplary nearline data set system environment 700, in accordance with one embodiment. As shown in FIG. 7, the nearline data set system environment 700 includes a logical volume 702 and a repository space 704. In one embodiment, the logical volume 702 may be one of a plurality of logical volumes within the nearline data set system environment 700. Additionally, portions of the logical volume 702 are physically stored within the repository space 704.

Additionally, the logical volume 702 includes a Volume Table of Contents (VTOC) 706 corresponding to a first portion 710 of the repository space 704. For example, the VTOC 706 may be physically stored within the first portion 710 of the repository space 704. In one embodiment, the VTOC 706 may include metadata that points to where physical extent portions of files are located within the first data set 722 and the second data set 718. Further, the logical volume 702 includes a VSAM volume data set (VVDS) 708 corresponding to a second portion 712 of the repository space 704. For example, the VVDS 708 may be physically stored within the second portion 712 of the repository space 704. In one embodiment, the VVDS 708 may include metadata that describes one or more of a file type, an expiration time/date, a creation time/date, and an information type for each file stored within the nearline data set system environment 700.

Further still, the logical volume 702 includes a Basic Catalog Structure (BCS) 714 corresponding to a third portion 716 of the repository space 704. For example, the BCS 714 may be physically stored within the third portion 716 of the repository space 704. In one embodiment, the BCS 714 may include high level information about the files stored in the nearline data set system environment 700.

Also, the logical volume 702 includes a second data set 718 corresponding to a fourth portion 720 of the repository space 704. For example, the second data set 718 may be physically stored within the fourth portion 720 of the repository space 704. In one embodiment, the second data set 718 may include a portion of physical extents for a plurality of files stored within the nearline data set system environment 700.

In addition, the logical volume 702 includes a first data set 722 corresponding to a fifth portion 724 of the repository space 704. For example, the first data set 722 may be physically stored within the fifth portion 724 of the repository space 704. In one embodiment, the first data set 722 may include a portion of logical extents pointing to physical extents corresponding to those logical extents that are stored in cloud storage 726 of the nearline data set system environment 700. In another embodiment, the physical extents may be migrated from the repository space 704 to the cloud storage 726 and may be retrieved from the cloud storage 726 when accessed.

In this way, the logical extents for the plurality of files includes within the fifth portion 724 of the repository space 704 may not be backed by physical storage within the repository space 704 but may refer to physical extents stored within the cloud storage 726. Additionally, the portion of logical extents included within the first data set 722 may refer to physical extents having a size that exceeds the physical storage space of the repository space 704. Further, actions may be performed online utilizing file metadata stored within the VVDS 708, where the physical extents associated with the file metadata are stored offline in the cloud storage 726.

Further still, in one embodiment, a large logical environment that exceeds the amount of physical repository space 704 may be initially defined for the nearline data set system environment 700, and additional space maybe purchased and added to the physical repository space 704 as the system grows. In another embodiment, the logical volume 702 may share the repository space 704 with additional volumes within the nearline data set system environment 700.

Also, in one embodiment, one or more workloads may exceed the available storage in the repository space 704, and a number of files transitioning from nearline to online may exceed the storage in the available repository space 704. In response, in one embodiment, a software layer may change a logical volume/storage controller to which a data portion is returned. For example, a requested file from the cloud storage 726 may be restored to the logical volume 702 or may be restored to a thinly provisioned volume other than the logical volume 702 on another controller with available repository space.

In another embodiment, a software layer may move existing online files from thinly provisioned volumes to which the nearline file needs to return to a fully provisioned volume with space, or another storage controller with adequate provisioned space. In yet another embodiment, overflow storage groups could be used to help address this. In still another embodiment, the logical volumes within an overflow storage group could be fully provisioned to provide a minimum amount of real storage for unexpected processing spikes.

Additionally, in one embodiment, one or more file events may process one or more files within the nearline data set system environment 700. For example, events that only access/update the metadata associated with files may process without adjustment since the metadata is already online within the nearline data set system environment 700. For instance, in DFSMS, an ALTER request updates the metadata associated with a file.

Further, in one embodiment, one or more events (e.g., PRINT and REPRO, etc.) may access the physical extents associated with the file. In another embodiment, the data must be transitioned from the cloud storage 726 back to online storage at the repository space 704 in order to process these events. This may happen implicitly when the event is issued.

Further still, in one embodiment, one or more events may additionally process the offline objects stored in the cloud storage 726. For example, a DELETE event for a file may delete the metadata within the repository space 704 and may also delete all of the offline data objects associated with the file within the cloud storage 726. In another embodiment, events that change the location of the data but that do not change the data itself may be updated to make appropriate changes to the offline data structure within the cloud storage 726. For example, a RENAME event may rename the objects to contain the updated file name. In another example, a MOVE event may rename the objects and move them to the container(s) that correlate to the newly assigned logical volume(s). In yet another example, a COPY event may copy the objects from the existing container(s) to the new appropriate container(s) and may allocate the new file with equivalent extent ranges.

Also, in one embodiment, a subsequent archive of a nearline file may be optimized by not first transitioning the file back to online storage at the repository space 704. For example, a software layer may perform standard archive processing for the metadata and may create new metadata objects in the object store of the cloud storage 726. In another example, the software layer may maintain an inventory of these metadata objects along with the existing nearline data objects. In this way, archiving a file may free up logical extent space within a thinly provisioned volume.

Additionally, managing the space within the exemplary nearline data set system environment 700 may include managing two space constraints—the available space within the online thinly provisioned volumes and the repository space. The repository space may be managed as described in the primary algorithm. The logical space may be managed through an existing high/low threshold logic for space management archive processing. In this way, extending a 1 TB size limit to 2 or 4 TB will respectively double and quadruple available online extent space.

Figure 8:
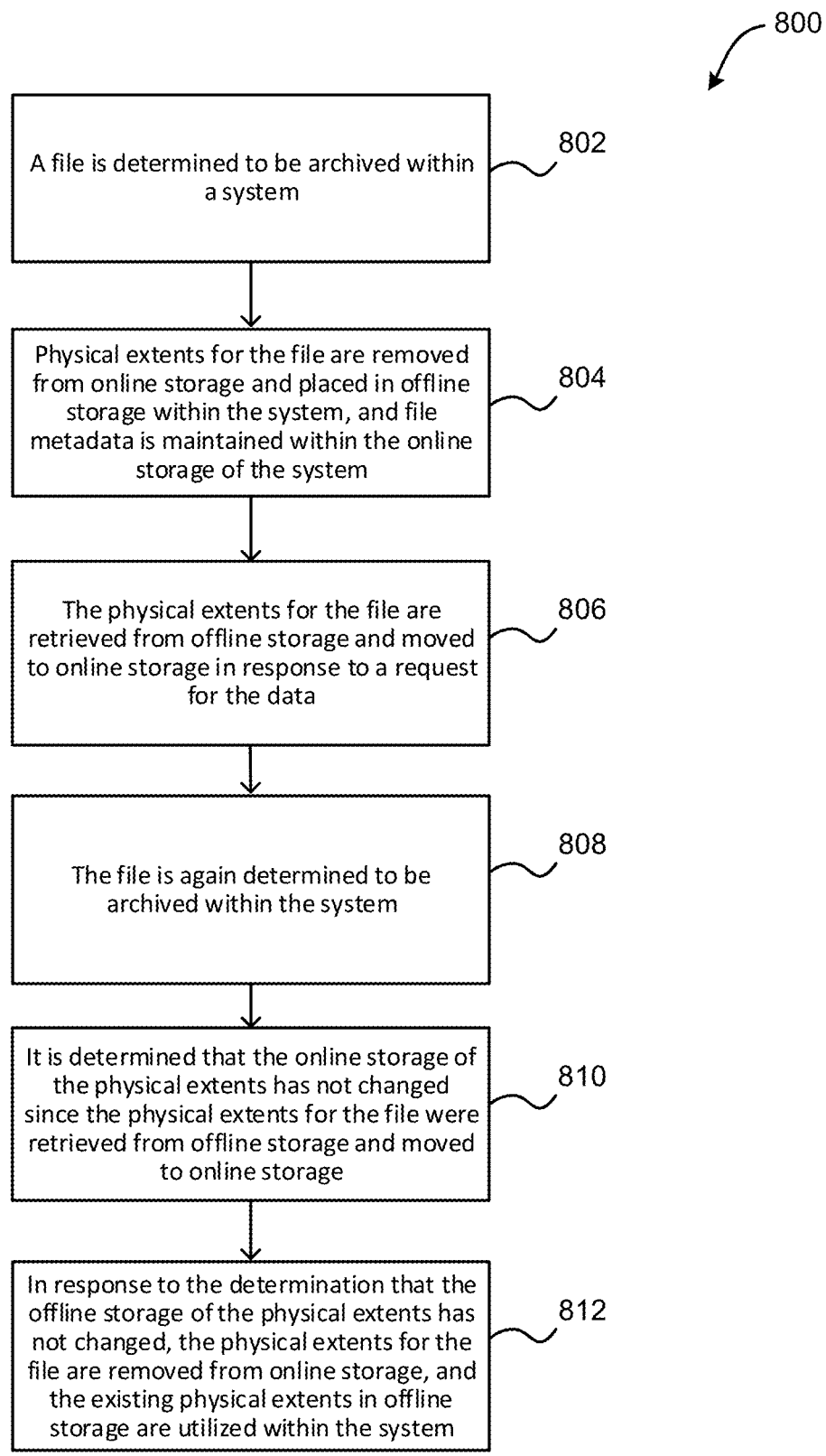
FIG. 8 illustrates a method for performing fast subsequent migration within a nearline storage environment, in accordance with one embodiment.

Now referring to FIG. 8, a flowchart of a method 800 for performing fast subsequent migration within a nearline storage environment is shown according to one embodiment. The method 800 may be performed in accordance with the present invention in any of the environments depicted in FIGS. 1-7, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where a file is determined to be archived within a system. Additionally, method 800 may proceed with operation 804, where physical extents for the file are removed from online storage and placed in offline storage within the system, and file metadata is maintained within the online storage of the system. In one embodiment, the file metadata may include an indication that the physical extents are stored in the offline storage. Further, method 800 may proceed with operation 806, where the physical extents for the file are retrieved from offline storage and moved to online storage in response to a request for the file. In one embodiment, the file metadata may be changed to include an indication that the physical extents are stored in the online storage.

Further still, method 800 may proceed with operation 808, where the file is again determined to be archived within the system. Also, method 800 may proceed with operation 810, where it is determined that the online storage of the physical extents has not changed since the physical extents for the file were retrieved from offline storage and moved to online storage. For example, the validity of the physical extents stored in the offline storage may be confirmed. Additionally, method 800 may proceed with operation 812, where in response to the determination that the online storage of the physical extents has not changed, the physical extents for the file are removed from online storage, and the existing physical extents in offline storage are utilized within the system.

In one embodiment, the existing physical extents in offline storage may be identified by the file metadata within the online storage of the system. In another embodiment, the file metadata may be changed to include an indication that the physical extents are again stored in the offline storage. In this way, redundant transfer of physical extents from online to offline storage may be avoided.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   identifying a file to be archived, where such file includes one or more physical extents that comprise a data portion of the file as well as file metadata located within online storage of a system, the file metadata including one or more logical pointers to an original location of the one or more physical extents within the online storage of the system;
   archiving the file by:
      maintaining the file metadata within the online storage of the system, and
      removing the one or more physical extents from the online storage of the system, and placing the one or more physical extents in offline storage of the system; and
   performing an action associated with the file, utilizing one or more of the file metadata and the one or more physical extents, including:
      intercepting a request for access to the file metadata, and
      retrieving the file metadata of the file from the online storage of the system without accessing the offline storage of the system.

2. The computer-implemented method of claim 1, wherein the file is selected to be archived in response to determining that the file has not been referenced for a predetermined period of time.

3. The computer-implemented method of claim 1, wherein the file metadata includes a location of the one or more physical extents within the offline storage of the system.

4. The computer-implemented method of claim 1, wherein the one or more physical extents are stored within an object of the offline storage of the system, and a name of the object of the offline storage of the system includes a physical location of the one or more physical extents within the online storage of the system.

5. The computer-implemented method of claim 1, wherein the file metadata further comprises an identifier of the file, an identifier of one or more users associated with the file, and a description of a data portion of the file.

6. The computer-implemented method of claim 1, wherein the file metadata is used for a return of the one or more physical extents from the offline storage to the online storage.

7. The computer-implemented method of claim 1, wherein archiving the file further includes:
   adding a flag to the file metadata, where the flag indicates that the file is a nearline file.

8. A computer program product for performing nearline storage of a file, the computer program product comprising a computer readable storage medium having program instructions embodied therewith, wherein the computer readable storage medium is not a transitory signal per se, the program instructions executable by a processor to cause the processor to perform a method comprising:
   identifying, by the processor, a file to be archived, where such file includes one or more physical extents that comprise a data portion of the file as well as file metadata located within online storage of a system, the file metadata including one or more logical pointers to an original location of the one or more physical extents within the online storage of the system;
   archiving the file by the processor by:
      maintaining the file metadata within the online storage of the system, and
      removing the one or more physical extents from the online storage of the system, and placing the one or more physical extents in offline storage of the system; and
   performing an action associated with the file by the processor, utilizing one or more of the file metadata and the one or more physical extents, including:
      intercepting, by the processor, a request for access to the file metadata, and
      retrieving, by the processor, the file metadata of the file from the online storage of the system without accessing the offline storage of the system.

9. The computer-implemented method of claim 1, further comprising:
   in response to determining that a predetermined amount of storage space is available within the online storage of the system, delaying the removing of the one or more physical extents.

10. The computer program product of claim 8, wherein the file is selected to be archived in response to determining that the file has not been referenced for a predetermined period of time.

11. The computer program product of claim 8, wherein the file metadata is updated to include a location of the one or more physical extents within the offline storage of the system.

12. The computer program product of claim 8, wherein the one or more physical extents are stored within an object of the offline storage of the system, and a name of the object of the offline storage of the system includes a physical location of the one or more physical extents within the online storage of the system.

13. The computer program product of claim 8, wherein the file metadata further comprises one or more of an identifier of the file, an identifier of one or more users associated with the file, and a description of a data portion of the file.

14. A computer-implemented method, comprising:
- identifying a file to be archived, where such file includes one or more physical extents that comprise a data portion of the file as well as file metadata located within online storage of a system, the file metadata including one or more logical pointers to an original location of the one or more physical extents within the online storage of the system;
- archiving the file by:
  - maintaining the file metadata within the online storage of the system, and
  - transferring the one or more physical extents from the online storage of the system to cloud storage of the system, including storing the one or more physical extents within an object within the cloud storage, the object having a name that includes a name of the file and a physical location of the one or more physical extents within the cloud storage of the system; and
- performing an action associated with the file, utilizing one or more of the file metadata and the one or more physical extents.

\* \* \* \* \*